US006843844B1

(12) United States Patent
Van Horn

(10) Patent No.: US 6,843,844 B1
(45) Date of Patent: Jan. 18, 2005

(54) MODIFIED CELLULOSE AGGREGATE MATERIAL

(75) Inventor: Kenneth C. Van Horn, Orlando, FL (US)

(73) Assignee: Therm-O-Lite Construction Products, Inc., Ft. Lauderdale, FL (US)

( * ) Notice: Subject to any disclaimer, the term of this patent is extended or adjusted under 35 U.S.C. 154(b) by 0 days.

(21) Appl. No.: 10/054,238

(22) Filed: Jan. 22, 2002

(51) Int. Cl.$^7$ .............................................. C04B 18/18
(52) U.S. Cl. ..................................................... 106/697
(58) Field of Search ........................................ 106/697

(56) References Cited

U.S. PATENT DOCUMENTS

| | | | | |
|---|---|---|---|---|
| 1,635,212 | A | * | 7/1927 | Herrly |
| 3,030,222 | A | * | 4/1962 | Eichenlaub |
| 3,403,205 | A | * | 9/1968 | Ottwnholm |
| 3,734,988 | A | * | 5/1973 | Aintablian |
| 3,873,351 | A | | 3/1975 | Ueda et al. |
| 4,028,130 | A | * | 6/1977 | Webster et al. |
| 4,040,851 | A | | 8/1977 | Ziegler |
| 4,210,457 | A | * | 7/1980 | Dodson et al. |
| 4,402,751 | A | | 9/1983 | Wilde |
| 4,629,508 | A | * | 12/1986 | Cain, Jr. et al. |
| 5,196,061 | A | | 3/1993 | Thomas et al. |
| 5,340,513 | A | * | 8/1994 | Koslowski et al. |
| 5,346,549 | A | * | 9/1994 | Johnson |
| 5,391,245 | A | * | 2/1995 | Turner |
| 5,484,480 | A | * | 1/1996 | Styron |
| 5,641,584 | A | * | 6/1997 | Anderson et al. |
| 5,669,969 | A | | 9/1997 | Meade et al. |
| 5,785,419 | A | | 7/1998 | McKelvey |
| 5,851,281 | A | * | 12/1998 | Alves |

FOREIGN PATENT DOCUMENTS

| | | | |
|---|---|---|---|
| EP | 0263723 | * | 11/1986 |
| WO | 87/05894 | * | 10/1987 |

* cited by examiner

Primary Examiner—Archene Turner
(74) Attorney, Agent, or Firm—Richard S. Vermut; Rogers Towers, P.A.

(57) ABSTRACT

A process and method is disclosed for producing a cellulose modified aggregate cement. The process and method advantageously applies a fortifying solution to a dry cellulose material so as to enable substantially complete absorption of the vital components of the solution into and upon the cellulose fibers. The fortifying solution also imparts to and forms a mixture with the fiber so as to provide sufficient water for hydration and cure of cement added thereto, without the need to extract excess water therefrom, thereby preventing the loss of said vital fortifying agents from the aggregate cement formed thereby. Upon admixing cement into the solution treated fibers, a plastic mixture of concrete is formed, well adapted for pouring into press molds for the fabrication of lightweight, high strength construction forms. In an alternative embodiment, a means of forming a raw aggregate material, while simultaneously reclaiming submerged land is disclosed. In the alternative process and method, cellulose waste material is added to submerged land to absorb, and form a wet pile of material there within. The waste material is then allowed to dry. Thereafter the material is treated with anti-mold agents, re-dried and purified/ comminuted into cellulose fibers. Thereafter, the material is treated with fortifying agents in a pool. The material is once again allowed to dry and thereafter pressure treated with activating and water proofing materials to yield a raw cellulose modified aggregate.

72 Claims, 3 Drawing Sheets

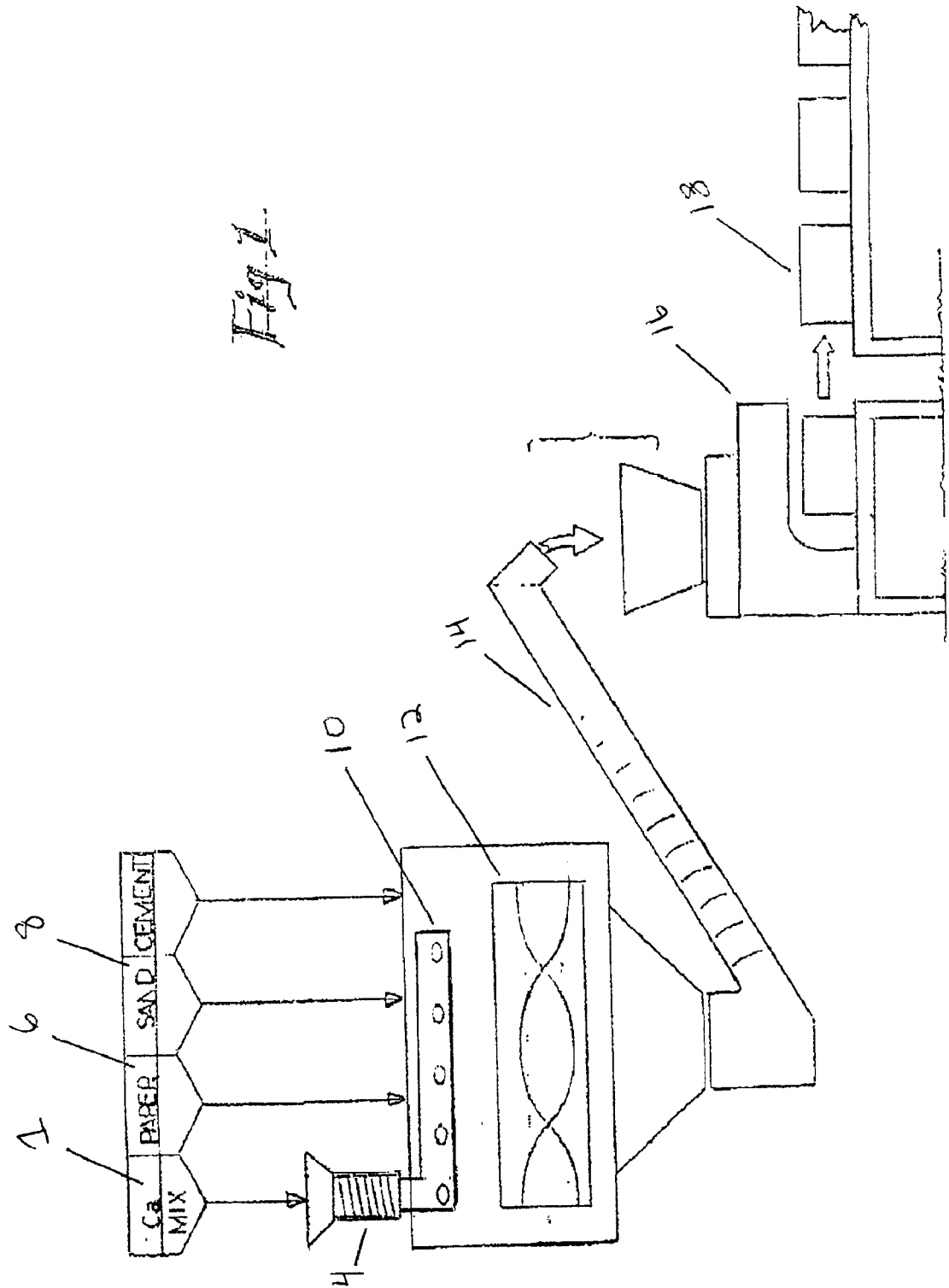

MODIFIED CELLULOSE AGGREGATE MATERIAL

TECHNICAL FIELD

The method, process and composition disclosed herein relate to aggregate concrete materials as well as the processes and method for producing same. Such technology specifically relates to those processes in which cellulose fibers, strengthened, preserved and compatiblized via a fortifying solution, are utilized to form lighter-than-concrete building materials.

BACKGROUND OF THE ART

Concrete is a most useful and advantageous building material. Concrete is extremely durable, non-flammable, and demonstrates high compressive strengths. Concrete is also impervious to both wood destroying insects/vermin as well as dry rot. However, concrete also demonstrates limitations in adaptability and onsite modifications when compared to wood and other construction materials. For example, concrete may be easily molded and formed, from a plastic state, to a fully cured solid, in conformance with virtually any selected mold. However, modification of a fully cured cement material, by means of cutting, drilling or sanding is very limited as the material tends to fracture. In addition, assembly of concrete to other non-concrete materials also poses greater difficulties than other materials in that drilling, nailing and bolting concrete structures suffers from the same fracture failure inherent in this crystalline material.

The construction of onsite molds for forming structural elements is far more expensive then wood frame construction. Concrete block materials and construction techniques utilizing such materials reduces the cost of expensive onsite molds. Also, individual blocks are more easily handled and arranged in building desired structures. However, concrete blocks are inherently heavy and thus the cost of producing structures based on concrete block structural elements must include the increased cost of transporting such materials.

In order to lighten the weight of pre-formed concrete building materials, and, in certain instances, improve the fire-resistance thereof, lightweight concrete aggregate materials have been disclosed wherein cellulose fiber, one or more cements and potable water are utilized to form a lightweight aggregate concrete materials. U.S. Pat. No. 5,785,419 ('419) disclosed a lightweight building material comprised of a mixture of 66–89.5% Portland type I/II cement; 0–23% fly ash; and 5.8 to 11.5% cellulose fiber. The aforementioned components are in dry form. The process disclosed in the '419 patent entails mixing the dry components with water in a ratio of 10 gallons of water to 68 pounds of dry component (cements, fly ash and fiber). More specifically, the mixing procedure of the '419 patent commences with the mixing of water and cellulose fiber first. Thereafter, cement and fly ash are added to the wet pulp and the four components are mixed for at least five minutes. Thereafter, excess water is compressed out of the mixture via a water extraction means so as to yield a dry cake-like material. The cake-like material is thereafter processed by a crumbler device so as to yield pellet like pieces of material which are allowed to cure.

The dry pellets of the '419 patent, formed of cement, fly ash and cellulose fiber, are thereafter mixed with sand/cement admixtures and water sufficient to hydrate the cement. The hydrated material is then placed in a hydraulic press/mold defining the desired construction material shape and allowed to cure. The resultant material is a lightweight concrete aggregate capable of being sanded, chiseled, drilled, sawed, nailed and bolted in a manner similar to as those techniques utilized in connection with wood construction materials.

As stated above, in practicing the aggregate cement process and methods of the prior art, such as, for example, those disclosed in the '419 patent, after mixing the saturated pulp fiber with the Portland cement and fly ash, excess water is compressed, squeezed or otherwise extracted from the mixture. Thereafter the cake-like resulting structure is mechanically crumbled into pellet like particles and allowed to cure. The cured particles are thereafter mixed with a fortifying admixture, additional cement and water in order to form a plastic aggregate mixture for use in structural and other molds. The aforementioned process and method require the extraction of excess water from an initial mix, an intermediate cure, addition of further amounts of water, cement and admixtures prior to providing a moldable material. The prior art, such as that disclosed by the '419 patent teaches the use of hydrated wet pulp or wet paper fiber for combination with other mixture materials. Hydrated pulp, already saturated with water, does not absorb fortifying solutions to the same extent as dried pulp. In addition, removing water from pulp, already treated with fly ash and or other fortifying agents, tends to cause the loss of such vital mixture components from the aggregate material it is intended to benefit. Furthermore, the addition of other admixture materials and cement, subsequent to initial cement, fly ash saturation of the pulp fiber during the initial mix, reduces the ability of such components to truly penetrate and fully incorporate the pulp fiber within the final aggregate matrix. Additionally, the steps of dehydration and rehydration of the material add additional steps, equipment, costs and time to the manufacturing process.

What is needed is a method and process for producing a lightweight aggregate cement, wherein excess water, and the fortifying agents therein, are not necessarily removed from the paper fiber to which they are intended to be incorporated and wherein all the water necessary to hydrate the cement component therein, is incorporated into an initial mix so as to obviate multiple curing stages. A process having less steps results in a simpler process having lower costs, less equipment and faster production.

SUMMARY OF THE INVENTION

Now in accordance with the present invention, a method and process of forming a lightweight cellulose modified aggregate cement is disclosed wherein dry pulp fiber is effectively and efficiently saturated with a fortifying solution demonstrating a water content sufficient to provide said saturation and to hydrate cement added to said mixture so as to yield a moldable material suitable for use in the formation of molded construction components. The method and process of the present invention provides such an aggregate material without need for the extraction of excess water or the vital fortifying agents therein or the need to provide additional water to said mixture, after an initial cure, in order to hydrate same.

In practicing the process of the present invention, a pre-mixer is loaded with a sufficient amount of water to complete the entire batch. The pre-mixer is then activated for continuous stirring while finely ground fortifying compounds comprising, for example, calcium silicates, aluminates, ferrites with small amounts of magnesium, alkalies of potassium, sodium oxide, gypsum, calcium carbonate and water proofing.

The mixture is used, in a similar manner to other fortifying mixtures, to fortify the fiber content of the mix to masonry quality. Plaster of Paris may be added al approximately ten weight percent, based on the dry weight of the mixture, in order to help minimize shrinkage. In addition, fly ash may be added to the mix in order to produce a more lightweight final aggregate product. These fortifying components are added to the pre-mixture as an admixture. Stirring of the fortifying solution for a period of 4 to 5 minutes, produces a milk-like consistency.

In a separate mixer, such as, for example, a concrete mixer, dry paper fiber, is placed for treatment by the pre-mixed fortifying solution. Since the paper fibers are dry prior to addition of the fortifying solution, all of the components thereof easily penetrate throughout the fiber. At this point, the mixture of fortified paper fibers contains all of the water necessary to hydrate the cement to be added thereto. The paper fiber is mixed with the fortifying solution for approximately 3 to 4 minutes prior to the addition of cement. The cement is added to the fortified fiber mixture in a controlled manner so as to yield the consistency and viscosity desired. In certain embodiments, sand may be thoroughly mixed with the dry paper fiber prior to treatment with the fortifying solution for those applications wherein the final construction product, as discussed below, requires such a sand component. Optionally, at a final mixing stage, large aggregates such as, for example, large sand, shale and pumice may be added as desired utilizing that principal, well known to the art, wherein finely ground ferrites, minerals and bonding agents are first absorbed by the fiber, prior to the addition of larger aggregates.

The resulting material is comprised of a fine granule structure coated with cement wherein the inside of each such granule is comprised of fiber saturated with fortifying solution. At this point, the resultant aggregate material can be placed in molds or extruded into any desired construction form. The molded material may be cured overnight (12 hours) at a temperature of about 100 degrees Fahrenheit.

The cellulose fiber is prepared, prior to fortification, by purification. The Purification is accomplished by means of a mechanical grinder such as, for example, a tub grinder. The grinder acts to grind the paper into small fibers and has screens which act as filters to remove plastic wraps and other impurities. Thereafter, an ammonia solution is applied to the fiber in order to prevent the growth of mold. However, prior to commencing the addition of fortifying solution to the fiber, the paper is dried, via any available means such as, for example, a centrifuge, artificial heat, sun-drying or a combination of techniques.

The dry, purified and comminuted cellulose fiber is treated in a fortifying solution comprised of, for example, calcium oxide, calcium chloride, fly ash, water proof sealer, calcium sulfate, calcium silicates, silica oxides and aluminum oxide. Calcium chloride and calcium hydroxide may also be advantageously selected as components of the fortifying solution. These components are well known to the art and may be configured and formulated in order to obtain desired properties. For example, by increasing the weight percentage of fly ash, one can produce a more light-weight final concrete product. Increasing calcium chloride or calcium hydroxides allows these activators to speed up the cure of the aggregate.

The present invention applies, as discussed in detail below, fortifying solution to dry cellulose fibers so as to ensure complete absorption of the vital components thereof into the fiber. The fortifying solution is initially mixed for a sufficient time so as to allow a substantially complete and uniform mixture. Thereafter, the solution is applied to dry cellulose fibers and mixed therewith for a time period long enough to ensure that the solution has achieved maximum penetration of the fiber. After sufficient mixing has been accomplished, cement, or a mixture of cement and sand is added, in a controlled fashion to the treated fiber so as to coat each fiber with cement. The water remaining in the mixture and available to the cement, is sufficient to hydrate and form a pliable cement mixture. However, by admixing cement to pre-treated fiber, the resulting concrete mix does not include excess water which, in the prior art, would require mechanical or other forms of extraction. The resulting concrete mix, comprised of individual cellulose fibers substantially saturated with fortifying components and coated with hydrated cemented, is easily poured into press molds for the production of desired construction forms. The material may be held in the mold for as long as is necessary for shaping. This may be as brief as three seconds or longer. The material is then heated, for example in a kiln, for a period of about 12 hours at approximately 100 degrees Fahrenheit to yield a finished, fully cured aggregate concrete building form. In certain embodiments, cement in combination with sand is admixed to the treated fiber solution where the final product such as, for example, construction blocks, require sand as a structural element.

In an alternate embodiment of the present Invention, a process and method for producing raw cellulose modified aggregate, while, at the same time allowing the reclaiming of submerged land, is disclosed. In practicing the alternate process of the present invention, raw cellulose waste material, such as, for example, natural surrounding and aquatic vegetation, industrial paper waste, recycled paper or other paper materials is added to and used to fill a natural pool or lake. The material is allowed to soak for a sufficient time to absorb maximum water and then pushed into a pile and allowed to sun-dry. After sun-drying, the material is treated with an antimold agents such as, for example, ammonia sulfate. Thereafter, the material is once again dried. The dried and anti-mold treated waste material is then processed within a grinder wherein impurities such as, for example, plastic materials are removed and the material is comminuted into cellulose fibers. A depression is then formed in the ground and lined with a chemically resistant liner. The depression is then filled with a fortifying solution comprised of fortifying agents such as those discussed above to form a fortifying pool. However, the fortifying solution does not contain activating agents or water proof admix components as such would, as described below, tend to cause the curing of material prematurely so as to block and clog conduits and pipes. After the cellulose fiber has been sufficiently treated with the fortifying solution, it is once again sun-dried. Thereafter, it is transported to a hopper from which a low pressure pump transports the material through a feed line to a high pressure pump. The high pressure pump pressurizes the material so that when a catalyst pump, just downstream from the high pressure pump adds activating agents and water seal admix components, the solution-treated fiber is placed in a highly pressurized state. Therefore, all of the fortifying agents, including the activating and water proofing agents added thereafter, are forced into the cellulose fibers for complete absorption within a mix tube leading from the high pressure pump to a processor/grinder. Within the mix tube, a heating element is utilized to raise the temperature of the treated cellulose aggregate mixture to about 120 degrees Fahrenheit. The aggregate exiting the mix tube is a cellulose modified aggregate which is ground up within the processor.

Thereafter, a rake is utilized to eliminate clumps. The resulting raw aggregate is extremely lightweight and thus economical to transport to the site of use where it may be mixed with water, cement, and in some instances sand, for the production of a cellulose modified aggregate cement.

BRIEF DESCRIPTION OF THE DRAWINGS

FIG. 1 illustrates an apparatus for use in practicing the manufacturing process for producing a cellulose modified aggregate based concrete in accordance with the present invention.

FIG. 2 is a cross sectional view of a cellulose fiber treated and prepared in accordance wit the method and process of the present invention.

DETAILED DESCRIPTION

Figure 3A:
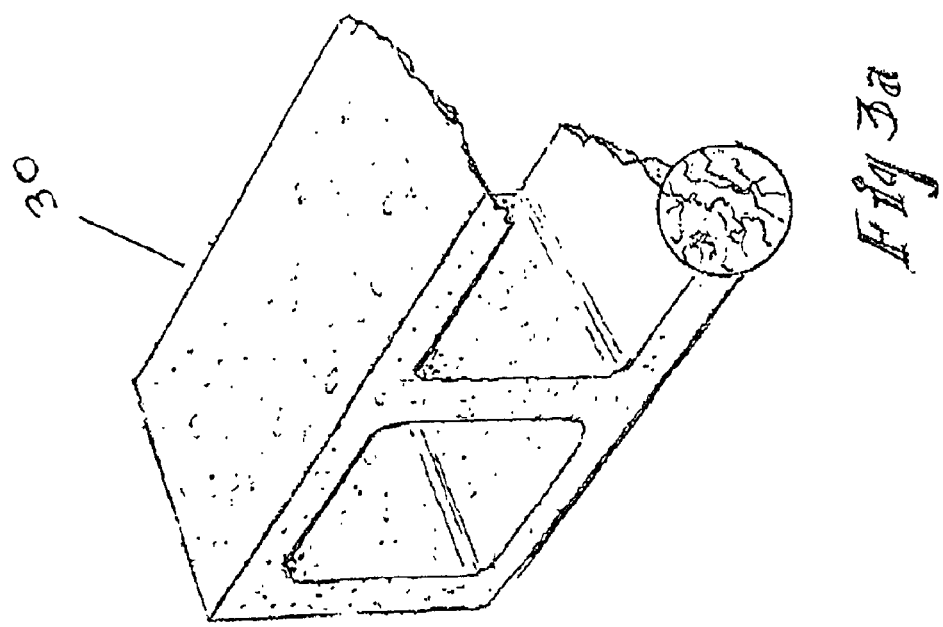
FIG. 3a is a magnified sectional view of a standard building block comprised of a cellulose modified aggregate based-concrete in accordance with the present invention.

The process and method of the present invention may be advantageously utilized to produce molded construction forms. The present invention combines a fortifying mixture with, for example, paper fibers to form an aggregate base. To the aggregate base, cements, such as, for example, Portland cement, and in certain embodiments, coarse sand is added.

The fortifying solution is first prepared in a pre-mixer utilizing, for example, vertical blades for thorough blending all of the components therein. Thereafter, the fortifying solution is combined with a mixture of dry paper fiber in a mixer such as, for example, a cement mixer for approximately 3 to 4 minutes. After the fiber has been fully saturated with the fortifying solution, Portland cement is added to the mixture. The combined mixture of fortifying solution, paper fiber and cement contains sufficient water for hydrating the cement. The cement is added to the saturated fiber in a controlled manner so as to enable to formation of a desired consistency and viscosity. If, as discussed below, the final aggregate cement requires sand, sand is added simultaneously with the Portland cement. There is no need to extract water from the saturated fiber as all water bound fortifying agents have already been applied to and thoroughly absorbed by the fiber. The remaining water from the fortifying solution is actively applied to hydrating the cement added and which coats the fiber.

In practicing the process and method of the present invention, a fortifying mixture is first prepared. The fortifying mixture is comprised of, and includes a quantity of water selected so as to eliminate excess water to ensure that after the incorporation of paper fiber and sand therein, there is no need to extract excess water. The fortifying solution is formulated so that it incorporates sufficient water to saturate the cellulose fiber with fortifying agents as well as a sufficient amount of water to thoroughly hydrate and so commence the cure of the mix, once cement is added to the fortified cellulose fiber. Thus, subsequent to fiber treatment with fortifying solution, there is no need to add water.

EXAMPLE

The process and method of the present invention may be utilized in order to form fifty standard Thermolite construction forms. Paper fiber is initially prepared by removing impurities therefrom by means of a tub grinder. To the small resultant fibers, a solution of ammonia is added in order to prevent and/or halt the growth of mold thereon. Thereafter, the paper fiber is thoroughly dried utilizing a sun-drying technique.

In order to prepare a batch of cellulose modified aggregate based concrete sufficient to form 50 blocks, a fortifying solution is prepared for treatment of the purified and dried paper fiber as follows. The solution is comprised of 75 gallons of water, ¾ gallon of calcium chloride, ¾ gallon of water proof sealer, 30 pounds of calcium sulfate, 40 pounds of fly ash, and 80 pounds of calcium oxide. The dry weight of the mixture is equal to approximately 150 pounds.

The fortifying solution is prepared by initially adding 75 gallons of water into a vertical pre-mixer. The quantity of water selected is based upon the size of the batch desired. 2 pounds of fortifying solution is mixed with every 1 gallon of water. The pre-mixer is configured for continuous stirring during mixture preparation. The mixer is positioned vertically so the mixed water and fortifying solution will easily pour from the pre-mixer using gravity.

Calcium chloride is thereafter added to the water as a drying agent and/or an activator. Suitable calcium chloride may be selected to be in the form of a dry powder or slake lime. Alternatively, calcium hydroxide may be substituted for the calcium chloride with substantially equal effect and purpose. It is preferred to utilize a ratio of drying agent/lactivator of approximately ¾ gallons agent/activator for each 75 gallons of water.

A water sealer admix component is thereafter advantageously added to the fortifying mix. Suitable water sealers are well known to the art and commercially available such as dry block or, for example, Armor Seal™, available from Grace Industries or Armor Seal of Lakeland, Florida. The water sealer/preservative is advantageously selected to be present, in a ratio of about ¾ gallons of sealer to the 75 gallons of water.

Calcium carbonate or calcium sulfate is incorporated into the mix so as to control shrinkage of the final aggregate product. This component is added to the fortifying mix in a quantity so that calcium carbonate comprises approximately 21.5% of the dry weight of the fortifying solution, or, in regards to the present example of a preferred embodiment of the present invention, approximately 30 pounds. Calcium silicate or, alternatively, chalk, may be substituted for the calcium carbonate with substantially the same function and effect.

The aforementioned components are easily blended, by means of, for example, the vertical agitator blades of a pre-mixer, into a solution having the appearance of milk. To this mixture, fly ash is incorporated in an amount up to about 30% of the dry weight of the fortifying solution. The fly ash tends to lighten the weight of the final aggregate cement product. Thus, as the weight percentage of fly ash increases, the weight of the final product decreases. The fly ash is typically comprised of from about 1 to 12 weight percent aluminum oxide, from about 1 to 18 weight percent ferrites of iron oxide, from about 1 to 2% magnesium oxide, from about 1 to 2% titanium dioxide, from about 1 to 4 weight percent phosphorous pentoxide, from about 1 to 4 weight percent potassium oxide, from about 1 to 4 weight percent sodium oxide, and from about 1 to 4 weight percent sulfur trioxide, based on the total weight of the fly ash.

Calcium silicates such as, for example quartz crystalline silica may be advantageously added to the fortifying solution in a weight range of about 3% Mg/m³ total consistency of the dry weight of fortifying solution and 1% mg/m³ respirable and make up only 3% of 0.05 percent of the entire dry weight of the fortifying mix. Aluminum oxide may also be incorporated into the mix in a ratio of about 0.015 weight percent based upon the total dry weight of the fortifying mix thereby accounting for one pound per each 750 to 1000 pounds of complete dry weight of cellulose modified aggregate based concrete.

Calcium oxide is the fortifying solution component present in the greatest weight percentage accounting for approximately 65 weight percent based upon the total weight of the mixture, or in regards to the example described above, 80 pounds of the 150 pound total dry weight of the fortifying solution components. Calcium oxide may be present in a weight percentage of from about 30 to about 65 weight percent.

The fortifying solution mixture is stirred within the pre-mixer for a period of approximately 4 to 6 minutes so as to form a milk-like solution. Thereafter the mixture is allowed to flow down a drizzle tube extending into and along an upper portion of a main concrete mixer wherein paper, and, in certain embodiments, coarse sand has been mixed for 4 to 6 minutes.

The concrete mixer contains, prior to the addition of the aforementioned fortifying solution, an amount of paper fiber equal to approximately 20% of the combined weight of the fortifying solution (150 lb in this example) and the Portland cement (300 lb in this example) to be added thereto. The amount of cement to be added is calculated by multiplying the dry weight of the fortifying solution by 2. In the present example, multiplying 150 pounds by 2 to equal 300 pounds of cement. Thus the total dry weight of the fortifying mixture and the cement to be added thereto is 450 pounds. Therefore, approximately 90 to 100 pounds of dry paper fiber are added to the cement mixer. In those instances where sand is required in the final product, from about 15% to 50% of the combined dry weight of fortifying solution and cement in course sand is added to the cement mixer (60 to 225 lbs. in regard to the present example. However, not all indications/applications of the modified aggregate concrete of the present invention require sand. For example, other than construction forms that usually will contain sand, products being extruded or rolled into shape such as roof tile, or perhaps wall board, will not require sand. In such instances, the process, method and product of the present invention may incorporate, in place of sand, one additional pound of Portland cement for every pound of paper to which the fortifying solution is added. For example, in the above and below-described example of a preferred embodiment, instead of combining 150 pounds (dry weight) of fortifying solution with 100 pounds of paper, 15–50 combined weight percent sand, 35% being preferred (about 60 to about 225 pounds), and about 300 pounds of cement, the sand may be eliminated and 400 pounds of cement is utilized to form a richer mixture The paper fiber and sand are thoroughly mixed in the cement mixer for 4 to 6 minutes prior to addition of the fortifying solution. The paper fiber/sand mixture in the present example is comprised of 100 pounds of paper fiber and 50 to 150 pounds of coarse sand. The sand content is selected within the aforementioned range depending upon the use and application of the final aggregate product. The cement content is advantageously selected to be approximately twice the dry weight of the fortifying solution, or, in this example, 300 pounds of Portland cement. However, the cement, as described below is added at the last stage of mixing so as to allow the consistency of the final mixture to be accurately set without losing any of the vital elements of the fortifying solution which might otherwise be lost during the discarding of excess water in the method and processes of the prior art.

Prior to the addition of the fortifying solution, the mixture of sand and paper fiber is placed into the concrete mixer where it is blended, at a temperature range of from about 65 to about 85 degrees Fahrenheit for about 4 to 6 minutes or until the mixture is thoroughly blended. After the fortifying mixture in the pre-mixer and the paper fiber/sand mixture in the concrete mixer have been thoroughly blended, the fortifying solution is added to the cement mixer, via a drizzle tube until all of the fortifying mixture has been added via a drizzle tube. The mixture of paper fiber, sand and pre-mixed fortifying mixture is blended within the cement mixer for approximately 4 to 6 minutes and until the mixture is thoroughly mixed and blended. Blending/mixing is advantageously accomplished at a temperature of from about 65 to about 85 degree Fahrenheit. This temperature is maintained throughout the blending process up to, and including addition of Portland cement to the mixture.

Dry cement powder, such as Portland cement, is added to the fortified paper fiber/sand mixture in a gradual and controlled manner so as to provide the viscosity and strength desired for the particular application sought. For example, depending on form size and configuration, viscosity control allows sufficient flow of the material, prior to cure, so as to completely and uniformly fill such molds with minimal porosities or other pour failures.

The paper fiber utilized in practicing the method and process of the present invention may be advantageously selected to be a commercially manufactured fiber produced by U.S. Fiber Corp. of Tampa, Fla. This fiber is manufactured utilizing ammonia sulfate and boric acid as fiber additives. However, recycled papers may also be utilized in practicing the present invention and would not require the addition of ammonia sulfate to be added and dried in to the paper. The waste management or recycling industry may also be a suitable source of clean usable fiber for the production of a modified aggregate cement in accordance with the present invention.

In certain embodiments of the present invention, boric acid or boran borax may be added to the paper fiber, prior to fortification, in order to prevent termites and/or other vermin from attacking the paper fiber. Also, it is contemplated that ammonia solutions and/or ammonia sulfate may be utilized to protect the fiber from mold.

In practicing the process and method of the present invention, the paper fiber is thoroughly dried prior to the addition of the fortifying solution so as to ensure total and complete absorption of the fortifying solution within the fibers. The incorporation of a fortifying solution with a limited and defined amount of water therein, also ensures that concrete may be added to the fortifying solution/fiber mixture without the need to remove excess water therefrom. Thus, since the fortifying solution is in liquid form, it is thoroughly absorbed by the dry fiber before any cement is added. Since dry cement is added to the preconditioned fortified fiber—without the need for addition of further water to activate the cement—none of the beneficial elements of the fortifying mixture are lost or diluted from the fiber. Thus, the present invention provides a method and process wherein an especially formulated fortifying solution is utilized to both thoroughly penetrate and fortify dry paper fiber, while also incorporating sufficient water to activate and cure dry cement added thereto. Thus, by eliminating the need to dry the fortifying solution/paper fiber prior to the addition of cement, none of the valuable and enhancing fortifying components are lost. At the same time, since the fortifying solution includes sufficient free water to activate the dry cement added thereto, no loss or leaching out of such components from the fiber is caused by the use of additional water after fortification of the filler fiber.

FIG. 1 illustrates an apparatus well adapted for practice of the process and method of the present invention. A fortifying solution 1 comprised of, for example, calcium chloride, water proof sealer, calcium sulfate, fly ash and calcium oxide is admixed to a quantity of water held within premixer 4. The quantity of water is selected so that it is sufficient to thoroughly carry the aforementioned fortifying agents to and throughout the dry cellulose fiber, discussed below, while also being sufficient to hydrate cement to be added thereafter, without the need to extract any of said water from any mixture formed during the method and process described herein. The pre-mixer 4 is set for continuous mixing for a period of approximately 4 to 6 minutes, or until all components therein are thoroughly mixed so as to form an even, milk-like appearance by, for example, the action of vertical agitator blades. Below the pre-mixer 4, a quantity of paper 6, or other cellulose based fiber, is added a main concrete mixer 12, such as for example, a horizontal mixer. In those instances where the final cellulose modified aggregate concrete will require sand, such as, for instance, building blocks, a quantity of sand 8 is also added to the cement mixer. The mixture of sand and paper fiber is thereafter mixed for about 4 to 6 minutes or until the sand and fiber are well and substantially mixed. After the aforementioned pre-mixing of the fortifying solution has been completed, and the paper and sand have also been properly and adequately combined, the fortifying solution 1 is conducted downward, into the cement mixer 12, via a drizzle tube 10 located along an upper portion of and within the concrete mixer 12. The temperature for combining and mixing the components should be from about 65 to 85 degrees Fahrenheit. Thereafter, the fortifying solution, paper fiber and paper are mixed until the fiber has been well saturated with the fortifying solution. This may take about 4 to 6 minutes. Thereafter, Portland cement is admixed to the saturated fiber mix in a controlled manner so as to form an even mixture demonstrating the viscosity desired for proceeding with the molding process described below. If desired, larger sized aggregate material may be added thereto. The concrete aggregate mixture resulting therefrom includes sufficient water so as to allow it to flow from the main mixer 12 to conveyor 14 wherein the material is transported to a block forming mold 16 wherein the material may be molded or hydraulically press molded into any desired construction form such as, for example, standard construction blocks 18. Substantially no excess water is released, or is required to be released from the aggregate during the aforementioned process or, at any time during the molding and curing of the final forms. This is highly advantageous in that none of the valuable and highly beneficial properties provided by the fortifying components are lost due to excess water leaching or the intentional squeezing/compressing techniques utilized to actively extract water in other processes.

Figure 3B:
FIG. 3b illustrates a microscopic view of the lattice structure produced by and found within cellulose modified aggregate based concrete of the present invention.

As the fibers within the mixture come into contact with fortifying solution, they thoroughly absorb the fortifying components therein due to the dry state of the fiber. The fiber and mixture thus formed, retains a sufficient amount of water so as to enable the hydrating of and adherence of dry powder concrete to the surface of the fiber. Thus, as illustrated in FIG. 2, a cellulose fiber 24, treated with a fortifying solution and thereafter admixed with Portland cement, demonstrates absorption of fortifying solution components 26 within as well as upon the surface of the fiber. Clumps of hydrated cement powder 27 are shown adsorbed to the outside surface of the fiber which provides sufficient water to hydrate, and allow the cure of thereof. The fibers with the aggregate form an interlocking latticework, illustrated in FIG. 3b which provides strength to the final material, while also decreasing the weight thereof. Furthermore, the latticework allows the final aggregate material to be drilled, sanded, cut and otherwise shaped without the chipping, fragmentation and other structural failures associated with non-composite concrete materials. Thus construction blocks 30 formed in accordance with the method and processes of the present invention, as illustrated in FIG. 3a., incorporate such a latticework structure 32 providing a lighter, more durable product demonstrating the strength of concrete while allowing greater construction joining and shaping techniques to be utilized on the fully cured and formed material.

In an alternate preferred embodiment of the present invention, a process and method is disclosed wherein ponds, lakes and swampland may be reclaimed while, at the same time providing a cellulose modified aggregate. In practicing the method and process of the first alternate embodiment of the present invention, a suitable pond or lake is selected. Thereafter, cellulose waste material is added thereto. In addition to water, the lake may advantageously contain clay as well as cellulose fiber resulting from the breakdown of aquatic and non-aquatic vegetation.

The cellulose fiber waste is added to the pond or lake until it has absorbed the water sufficiently to allow the formation of a mound of water soaked waste material. The mound of fiber is allowed to sun-dry. Thereafter, ammonia sulfate is added to the material so as to prevent the breakdown thereof by the formation of mold and the mound is again allowed to dry. Although the material may be produced without the addition of ammonia sulfate, this anti-mold compound prevents later breakdown of the material.

The paper waste material is thereafter placed in a grinder so as to comminute the paper waste into a fibrous material and to eliminate contaminants, such as, for example, plastics, therefrom. Thereafter, the ground ammonia sulfate treated waste fiber is placed by, for example, a bulldozer, into a suitably sized dug out area, such as a fortifying pond, lined with a material demonstrating sufficient barrier qualities as to contain a fortifying solution filling said depression and prevent it from seeping through.

Figure 4:
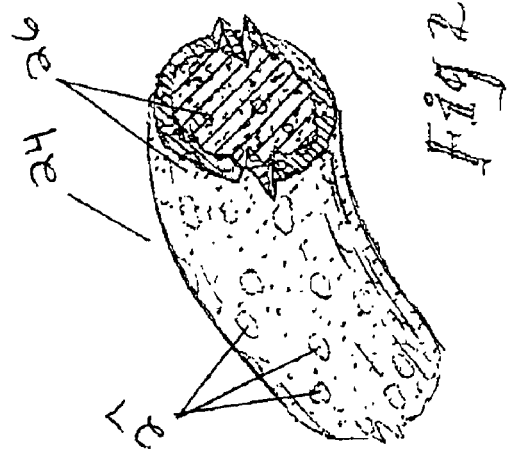
FIG. 4. is a flow chart illustrating the method and process of an alternate embodiment of the present invention.
Figure 4:
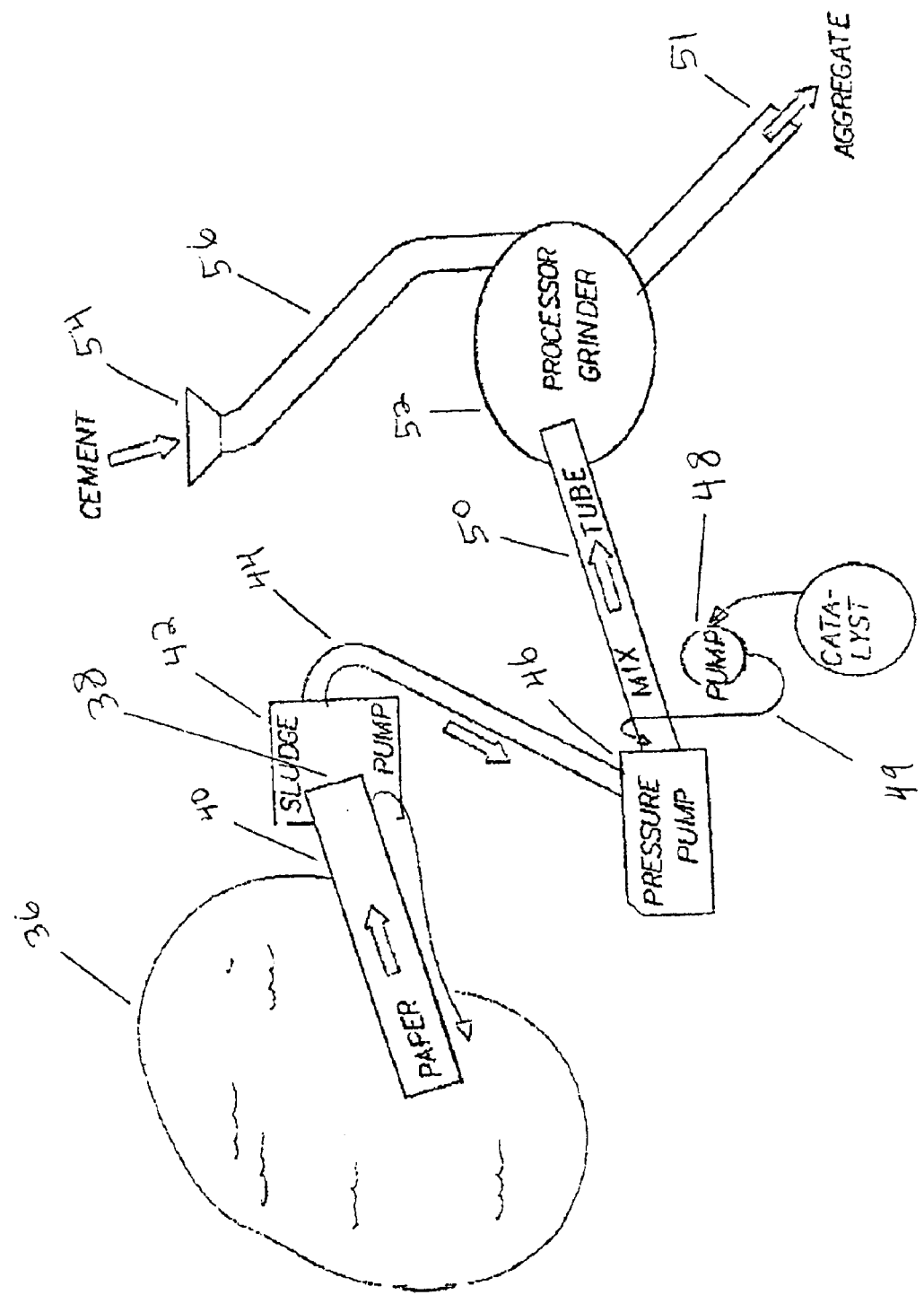

FIG. 4. is a schematic diagram representative of the process and method of the alternative embodiment of the present invention. The fortifying solution within the fortifying pond may have any of the usual fortifying components such as, for example crushed limestone, gypsum or fly ash, but should not contain chemical activators such as, for example calcium chloride, plaster of Paris, calcium hydroxide or water proof sealer. These two types of chemical activators might cause the material to set up prematurely or block the below-mentioned pumps.

The paper fiber is then treated within the fortifying pond 36 long enough for the fortifying solution to be fully absorbed into the paper fiber. Thereafter, the treated fiber is removed from the fortifying pond by screens and placed into a hopper 38 by suitable means such as, for example, conveyor 40. From the hopper 38, the fortifying solution soaked paper waste material is propelled, via a first pump 42, through feed line 44 to pressure treatment pump 46. The pressure treatment pump 46 is selected so as to pressurize the fortifying solution soaked paper fiber sufficiently so as to further drive said solution, and the components therein, deep into and throughout said fibers. Just downstream from the pressure treatment pump 46, a catalyst pump 48, injects activating agents 49, such as, for example, calcium chloride, calcium hydroxide and water proof sealer into the pressurized flow of fortifying agent soaked waste fiber exiting the pressure treatment pump 46 as said materials flow into and through mix tube 50. Within mix tube 50, a heating means, such as, for example, a calrod unit, is utilized to heat the mixture to about 120 degrees Fahrenheit so as to assure curing thereof. Thereafter, said mixture is forced through said mix pipe to processor/grinder 52 wherein said materials are further ground. In front of the processor/grinder, a rake is provided to break up clumps in the raw aggregate material. It may then be stored in a hopper until ready to use. The raw aggregate exits the processor grinder through delivery tube 51. At this point, the raw aggregate, not having been mixed with cements or hydrated for such, is extremely light weight and easily transported by truck to a site of use. By adding cement, water and for some applications such as construction blocks, sand, the material may be easily provide the proper consistency for the press molding of any desired construction form.

Alternatively, cement may be added by a hopper 54 and cement feed tube 56, into the processor grinder right at the site of aggregate manufacture. In this manner, aggregate concrete may be produced. However, production of such concrete at the manufacturing point will increase transportation costs as aggregate concrete is substantially heavier than raw aggregate.

While this invention has been described in terms of several embodiments, it is contemplated that alterations, permutations, and equivalents thereof will become apparent to one of ordinary skill in the art upon reading this specification in view of the drawings supplied herewith. It is therefore intended that the invention and any claims related thereto include all such alterations, permutations, and equivalents that are encompassed by the spirit and scope of this invention.

I claim:

1. A process for preparing a cellulose modified aggregate concrete mixture comprising:
   selecting a quantity of cellulose material;
   purifying and grinding said material so as to form purified cellulose fibers therefrom;
   drying said purified cellulose fibers;
   preparing a fortifying solution comprised of at least one fortifying component and sufficient water for the final aggregate concrete mixture;
   applying said fortifying solution to and mixing said solution with a quantity of dried cellulose fibers until solution and the at least one fortifying component therein have thoroughly coated and penetrated said fibers to produce a fortified fiber mixture; and
   admixing a quantity of cement to said fortified fiber mixture, wherein said quantity of cement is sufficient to coat the fibers within said fortified fiber mixture and utilize substantially all remaining water therein to hydrate and activate the cement coating such that a cellulose modified aggregate concrete mixture is formed demonstrating sufficient hydration so as to allow said concrete mixture to be press molded and be fully cured into any desired shape without the necessity of extracting water therefrom.

2. The process of claim 1 wherein the cellulose material is a manufactured paper fiber.

3. The process of claim 1 wherein the cellulose material is recycled paper.

4. The process of claim 1 wherein the cellulose material is an industrial waste material.

5. The process of claim 1 wherein the cellulose fibers are treated with boran borax prior to treatment with said fortifying solution.

6. The process of claim 1 wherein the cellulose fibers are treated with boric acid prior to treatment with said fortifying solution.

7. The process of claim 1 wherein the cellulose fibers are treated with an ammonia solution prior to treatment with said fortifying solution.

8. The process of claim 7 wherein the ammonia solution is an ammonium sulfate solution.

9. The process of claim 1 wherein the fibers are dried utilizing an artificial heat source.

10. The process of claim 1 wherein the fibers are dried utilizing a centrifuge.

11. The process of claim 1 wherein the fibers are sun-dried.

12. The process of claim 1 wherein the fortifying solution is comprised of calcium oxide, silica oxide, water proof sealer, activator and water.

13. The process of claim 12 wherein the activator is calcium chloride, calcium hydroxide or combinations thereof.

14. The process of claim 12 wherein said fortifying solution is further comprised of fly ash.

15. The process of claim 12 wherein said fortifying solution further comprises calcium sulfate, calcium carbonate or combinations thereof.

16. The process of claim 12 wherein said fortifying solution further comprises calcium silicate, aluminum oxide or combinations thereof.

17. The process of claim 1 wherein said fortifying solution is comprised of calcium chloride, water proof sealer, calcium sulfate, fly ash, calcium oxide and water.

18. The process of claim 17 wherein said calcium chloride is selected to be present in an amount equal to approximately ¾ gallons for each 75 gallons of water.

19. The process of claim 17 wherein said water proof sealer is selected to be present in an amount equal to approximately ¾ gallons for each 75 gallons of water.

20. The process of claim 17 wherein said calcium sulfate is selected to be present in an amount equal to approximately 21.5 weight percent based upon the total dry weight of the fortifying solution.

21. The process of claim 17 wherein said fly ash comprises approximately 30 weight percent of said fortifying solution based on the total dry weight thereof.

22. The process of claim 17 wherein said calcium oxide comprises approximately 65 weight percent of said fortifying solution based on the total dry weight thereof.

23. The process of claim 1 wherein the cement admixed to the coated fibers is Portland cement.

24. The process of claim 1 wherein the cement admixed to the coated fibers is selected to be present in an amount equal to approximately 15 weight percent to 50 weight percent of the total dry weight of the fortifying solution.

25. The process of claim 1 wherein the cement admix to the coated fibers is admixed with sand.

26. A process for preparing a cellulose modified aggregate while simultaneously reclaiming submerged land comprising:

selecting a cellulose based waste material;

depositing said cellulose based waste material into a selected body of water;

maintaining said cellulose waste material in said body of water until said waste material has absorbed a substantial amount of water therefrom;

removing said cellulose waste material from said body of water and allowing said material to sun-dry;

grinding said treated material so as to remove extraneous materials therefrom and so as to comminute said materials into fibers;

adding fortifying solution to said sun-dried cellulose fibers so as to strengthen, preserve, protect and fortify said material;

treating said sun-dried fibers with at least one activating agent and at least one water sealer admix component under high pressure and at increased temperature to cure said treated fibers into a raw aggregate material; and further grinding said raw aggregate material so as to yield a lightweight, waterproof material which may be used to produce a modified cellulose aggregate cement with the addition of cement and water.

27. The process of claim 26 wherein the cellulose material is recycled paper.

28. The process of claim 26 wherein the cellulose material is an industrial waste material.

29. The process of claim 26 wherein the cellulose material is natural waste material.

30. The process of claim 29 wherein the natural waste material is aquatic vegetation.

31. The process of claim 26 wherein the submerged land is a lake, pond or swamp land.

32. The process of claim 26 wherein the fortifying solution is comprised of calcium oxide, silica oxide and water.

33. The process of claim 26 wherein the fortifying solution is further comprised of fly ash.

34. The process of claim 32 wherein the fortifying solution is further comprised of fly ash.

35. The process of claim 32 wherein the fortifying solution further comprises calcium sulfate, calcium carbonate of combinations thereof.

36. The process of claim 32 wherein the fortifying solution further comprises calcium silicate, aluminum oxide or combinations thereof.

37. The process of claim 26 wherein the activator is calcium chloride, calcium hydroxide or combinations thereof.

38. The process of claim 26 further comprising adding water and cement to said raw aggregate material so as to form a cellulose modified aggregate cement.

39. The process of claim 38 further comprising the addition of sand to said material to form a cellulose modified aggregate cement.

40. The process of claim 26 wherein the sun-dried cellulose waste material is treated with an anti-mold solution to prevent growth of mold thereupon and then sun-dried.

41. The process of claim 40 wherein the anti-mold solution is ammonium sulfate.

42. The process of claim 40 wherein an artificial heat source is utilized to dry the cellulose waste material treated with an anti-mold solution.

43. The process of claim 26 wherein the aggregate is cured at a temperature of approximately 120 degrees Fahrenheit.

44. The process of claim 43 wherein an artificial heat source is utilized to cure said aggregate.

45. The process of claim 26 wherein an artificial heat source is utilized to dry the cellulose waste material.

46. A process for preparing a cellulose modified aggregate concrete mixture comprising:

preparing a fortifying solution comprised of at least one fortifying component and sufficient water for the final aggregate concrete mixture;

applying said fortifying solution to and mixing said solution with a quantity of dried cellulose fibers until said solution and the at least one fortifying component therein have thoroughly coated and penetrated said fibers to produce a fortified fiber mixture; and admixing a quantity of cement to said fortified fiber mixture, wherein said quantity of cement is sufficient to coat the fibers within said fortified fiber mixture and utilize substantially all remaining water therein to hydrate and activate the cement coating such that a cellulose modified aggregate concrete mixture is formed demonstrating sufficient hydration so as to allow said concrete mixture to be press molded and be fully cured into any desired shape without the necessity of extracting water therefrom.

47. The process of claim 46 wherein the cellulose fibers are comprised of manufactured paper fiber.

48. The process of claim 46 wherein the cellulose fibers are comprised of recycled paper.

49. The process of claim 46 wherein the cellulose fibers are comprised of industrial waste material.

50. The process of claim 46 wherein the cellulose fibers are treated with boran borax prior to treatment with said fortifying solution.

51. The process of claim 46 wherein the cellulose fibers are treated with boric acid prior to treatment with said fortifying solution.

52. The process of claim 46 wherein the cellulose fibers are treated with an ammonia solution prior to treatment with said fortifying solution.

53. The process of claim 52 wherein the ammonia solution is an ammonium sulfate solution.

54. The process of claim 46 wherein the cellulose fibers are dried utilizing an artificial heat source.

55. The process of claim 46 wherein the cellulose fibers are dried utilizing a centrifuge.

56. The process of claim 46 wherein the cellulose fibers are sun-dried.

57. The process of claim 46 wherein the fortifying solution is comprised of calcium oxide, silica oxide, water proof sealer, activator and water.

58. The process of claim 57 wherein the activator is calcium chloride, calcium hydroxide or combinations thereof.

59. The process of claim 57 wherein said fortifying solution is further comprised of fly ash.

60. The process of claim 57 wherein said fortifying solution further comprises calcium sulfate, calcium carbonate or combinations thereof.

61. The process of claim 57 wherein said fortifying solution further comprises calcium silicate, aluminum oxide or combinations thereof.

62. The process of claim 46 wherein said fortifying solution is comprised of calcium chloride, water proof sealer, calcium sulfate, fly ash, calcium oxide and water.

63. The process of claim 62 wherein said calcium chloride is selected to be present in an amount equal to approximately ¾ gallons for each 75 gallons of water.

64. The process of claim 62 wherein said water proof sealer is selected to be present in an amount equal to approximately ¾ gallons for each 75 gallons of water.

65. The process of claim 62 wherein said calcium sulfate is selected to be present in an amount equal to approximately 21.5 weight percent based upon the total dry weight of the fortifying solution.

66. The process of claim 62 wherein said fly ash comprises approximately 30 weight percent of said fortifying solution based on the total dry weight thereof.

67. The process of claim 62 wherein said calcium oxide comprises approximately 65 weight percent of said fortifying solution based on the total dry weight thereof.

68. The process of claim 46 wherein the cement admixed to the coated fibers is Portland cement.

69. The process of claim 46 wherein the cement admixed to the coated fibers is selected to be present in an amount equal to approximately 15 weight percent to 50 weight percent of the total dry weight of the fortifying solution.

70. The process of claim 46 wherein the cement admix to the coated fibers is admixed with sand.

71. The process of claim 46 wherein said step of applying said fortifying solution to and mixing said solution with a quantity of thoroughly dried cellulose fibers is preceded by the step of preparing the quantity of cellulose fibers, wherein said preparing includes purifying and grinding the quantity of cellulose fibers.

72. The process of claim 46 wherein said step of applying said fortifying solution to and mixing said solution with a quantity of thoroughly dried cellulose fibers is preceded by the step of preparing the quantity of cellulose fibers, wherein said preparing includes drying said purified cellulose fibers.

* * * * *